(12) United States Patent
Baker

(10) Patent No.: US 7,052,382 B2
(45) Date of Patent: May 30, 2006

(54) ACCESSORY ATTACHMENT FOR ROTARY HAND TOOLS

(75) Inventor: Timothy Baker, Roselle, IL (US)

(73) Assignee: Credo Technology Corporation, Broadview, IL (US)

( * ) Notice: Subject to any disclaimer, the term of this patent is extended or adjusted under 35 U.S.C. 154(b) by 245 days.

(21) Appl. No.: 10/648,041

(22) Filed: Aug. 26, 2003

(65) Prior Publication Data

US 2005/0048884 A1 Mar. 3, 2005

(51) Int. Cl.
*B24B 23/00* (2006.01)

(52) U.S. Cl. .................. 451/344; 451/358; 451/359

(58) Field of Classification Search ............ 451/344, 451/345–359
See application file for complete search history.

(56) References Cited

U.S. PATENT DOCUMENTS

| | | | |
|---|---|---|---|
| 2,198,921 A | 4/1940 | Shaff | |
| 2,726,689 A | 12/1955 | Busby | |
| 3,182,626 A * | 5/1965 | Stephens | 440/12.64 |
| 3,585,719 A | 6/1971 | Kivela | |
| 4,317,282 A | 3/1982 | Pace | |
| 4,751,970 A | 6/1988 | Hecker et al. | |
| 4,972,589 A | 11/1990 | Povleski | |
| 5,607,343 A * | 3/1997 | Keith et al. | 451/344 |
| 5,624,000 A | 4/1997 | Miller | |
| 5,863,159 A | 1/1999 | Lasko | |
| 6,048,260 A * | 4/2000 | Kopras | 451/358 |
| 6,352,127 B1 | 3/2002 | Yorde | |
| 2005/0009458 A1* | 1/2005 | Uzumcu et al. | 451/359 |
| 2005/0048884 A1* | 3/2005 | Baker | 451/358 |

* cited by examiner

*Primary Examiner*—Lee D. Wilson
(74) *Attorney, Agent, or Firm*—Greer, Burns & Crain, Ltd.

(57) ABSTRACT

The preferred embodiment of a rotary hand tool attachment is intended for coupling to a rotary power hand tool of the type that has a housing with a substantially cylindrical nose portion and a motor having an output shaft with a mounting coupling for receiving a drive shaft extending forwardly therefrom. The attachment includes a housing having an output shaft configured to drive a rotating tool, and an input shaft configured to couple with the drive shaft so that the motor output shaft, drive shaft and input shaft are aligned on a common axis. The housing also includes a mounting collar with a substantially cylindrical inside surface that is sized to slidably and snugly engage the nose portion. Additionally, a thin annular cylindrical layer of resilient material is disposed between the cylindrical inside surface of the housing and the nose portion.

22 Claims, 4 Drawing Sheets

ACCESSORY ATTACHMENT FOR ROTARY HAND TOOLS

BACKGROUND OF THE INVENTION

The present invention relates to attachments for rotary hand tools, and more specifically relates to alignment of attachments to rotary hand tools.

Small rotary hand tools that have a generally cylindrical housing or case have been marketed for many years for use in carrying out various woodworking and metal working tasks by hobbyists as well as commercial artisans. Such rotary hand tools generally have a motor unit with a rotary output shaft extending from the nose end and often have a nose portion that is configured to connect to various accessories or attachments. Some of these rotary hand tools are somewhat larger and more powerful and are known in the building trade as spiral saws that use a side cutting bit to penetrate and to rapidly cut holes for electrical outlets, light fixtures and switches and the like in dry wall. Because these tools are quite powerful even though they are relatively small, they are convenient to use on a jobsite or just about anywhere else where a source of AC power is available.

There has been continued innovation and improvement in the design of accessories for such hand tools, particularly with regard to the attachment of those accessories to a corresponding hand tool. Examples of those attachments are those produced under the Skil® and Bosch® brands by the Robert Bosch Tool Corporation of Mt. Prospect, Ill.

During use, it is important that accessories connecting directly to an output shaft of the rotary hand tool maintain a high level of alignment with respect to the motor output shaft axis, particularly where the rotational speed is high. However, conventional methods of coupling fail to provide sufficient precision alignment of the output axis of a rotary hand tool and the corresponding input axis of a rotary hand tool attachment, without simultaneously compromising the relative rigidity or tolerance of the coupling. Thus, during operation, misalignment frequently results in undesirable vibration. In addition, the heat generated from such vibration can eventually cause the attachment to weld itself to the rotary hand tool.

SUMMARY OF THE INVENTION

The present invention is related to attachments for rotary hand tools, and more specifically relates to attachments that may be quickly and securely attached and detached from the rotary hand tool, and that optimizes the alignment of the output axis of the rotary hand tool and the corresponding input axis of the attachment.

The preferred embodiment of a rotary hand tool attachment is intended for coupling to a rotary power hand tool of the type that has a housing with a substantially cylindrical nose portion and a motor having an output shaft with a mounting coupling for receiving a drive shaft extending forwardly therefrom. The attachment includes a housing having an output shaft configured to drive a rotating tool, and an input shaft configured to couple with the drive shaft so that the motor output shaft, drive shaft and input shaft are aligned on a common axis. The housing also includes a mounting collar with a substantially cylindrical inside surface that is sized to slidably and snugly engage the nose portion. Additionally, a thin annular cylindrical layer of resilient material is disposed between the cylindrical inside surface of the housing and the nose portion.

DETAILED DESCRIPTION OF THE INVENTION

Rotary hand tools that operate at high rates of rotation are susceptible to misalignment of the tool output shaft with the input shaft of any accessory attachment that may be coupled to the tool. Such misalignment creates undesirable vibration that is not only disruptive to the user, but which can ultimately result in damage to the rotary hand tool and/or the accessory attachment. For example, when accessory attachments are rotating at high RPM, the vibration due to imperfect alignment may actually cause the attachment to weld itself to the rotary hand tool. Thus, maintaining proper alignment of the tool output shaft and the accessory attachment input shaft is advantageous in that it prevents unwanted vibration and possible resulting damage.

Spiral saws are a typical example of a rotary hand tool that operates at high rates of rotation, frequently operating at 35,000 RPM. Typically, "dedicated" rotary power hand tools, or tools having a single specialized function, include a housing that encloses an electric motor that is coupled to a mechanism that provides the unique function of the tool. A spiral saw, however, typically includes a housing that encloses only a motor. This simplicity affords the spiral saw tremendous versatility, because it is capable of performing a multitude of additional tasks depending on the particular accessory attachment that is attached to the spiral saw.

However, dedicated rotary power hand tools have the benefit of gear or other mechanisms driven directly by the motor to be included within the main body of the tool, which provides for a single, solid, smooth-running unit because the functional mechanisms can be coupled directly and permanently to the motor. Conversely, spiral saws must utilize non-permanent, relatively non-rigid connections between the tool body and the accessory attachment. Moreover, the coupling elements of the spiral saw and the accessory attachment previously must been manufactured to very high tolerances to ensure accurate axial alignment.

However, unlike many prior tool, the preferred embodiment of the present invention provides an inexpensive, yet highly effective attachment mechanism that is capable of providing precision alignment between the output shaft of a rotary power hand tool, such as a spiral saw, and the input shaft of an accessory attachment.

Figure 2:
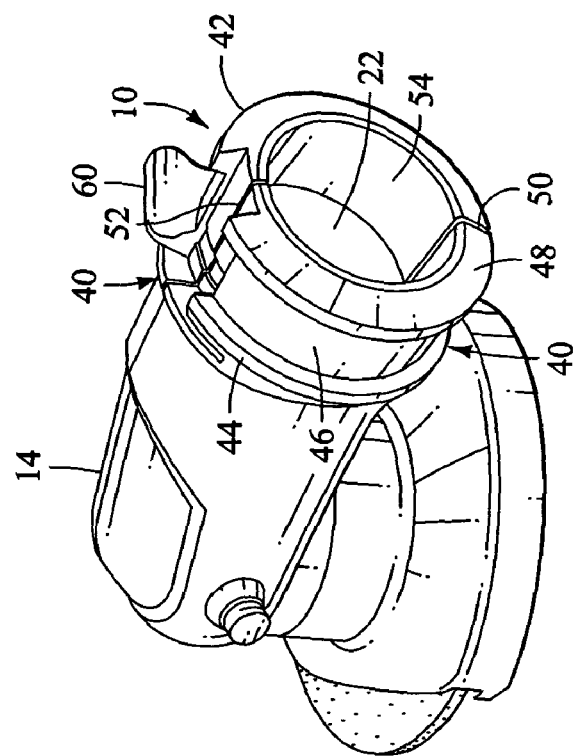
FIG. 2 is a rear perspective view of the accessory attachment illustrated in FIG. 1.
Figure 1:
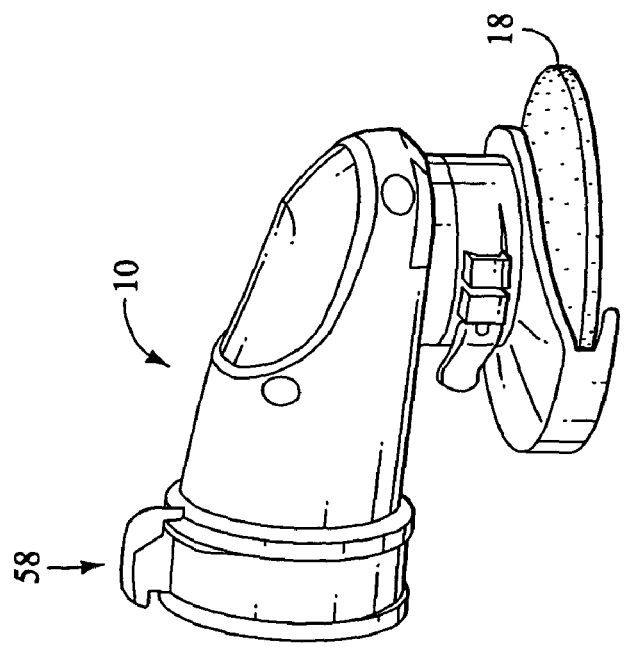
FIG. 1 is a front perspective view of the preferred embodiment of the accessory attachment.
Figure 3:
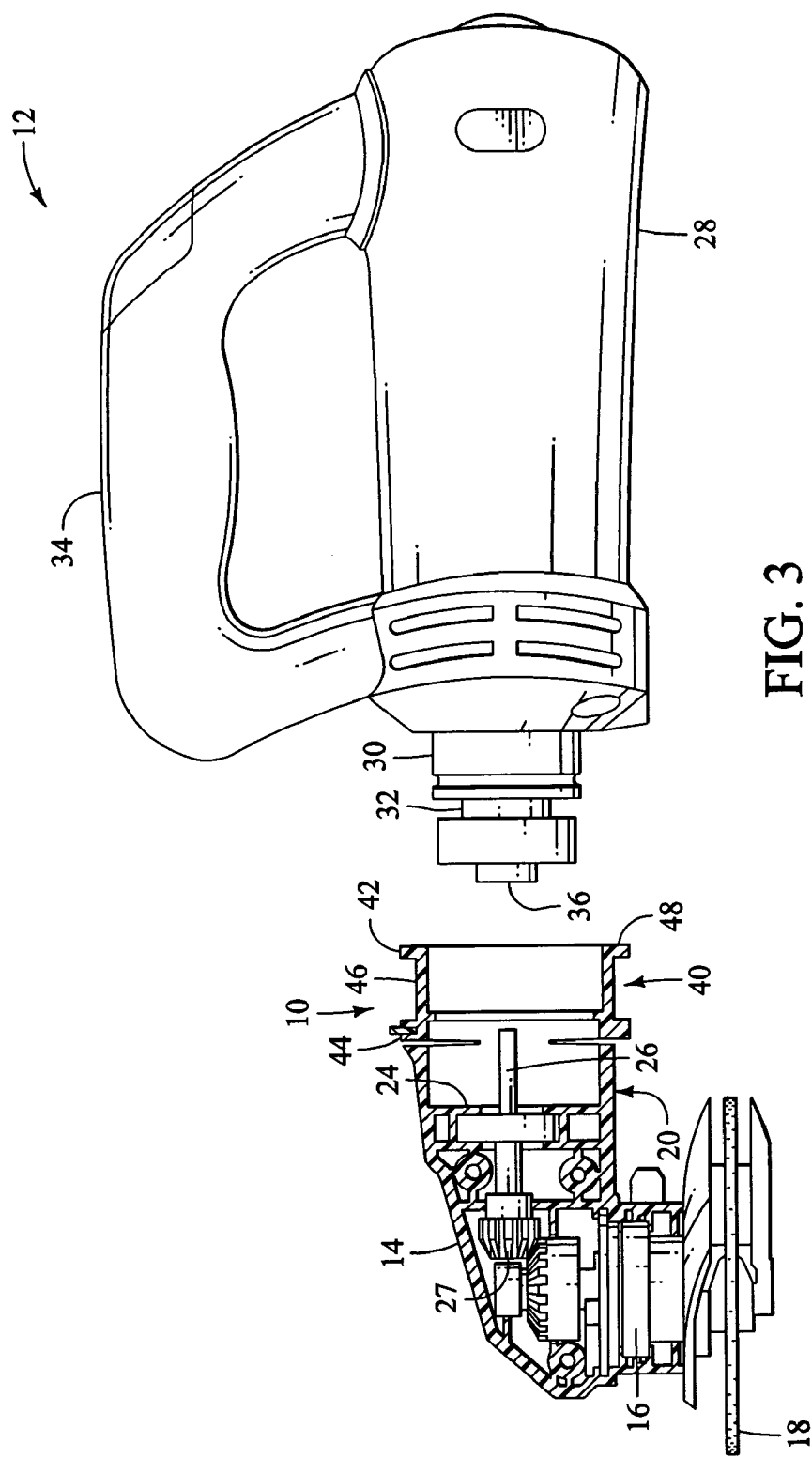
FIG. 3 is a side view of the accessory attachment illustrated in FIG. 1 shown partially in cross-section through the middle of the attachment, and shown together with a power hand tool to which the accessory attachment can be coupled.
Figure 4:
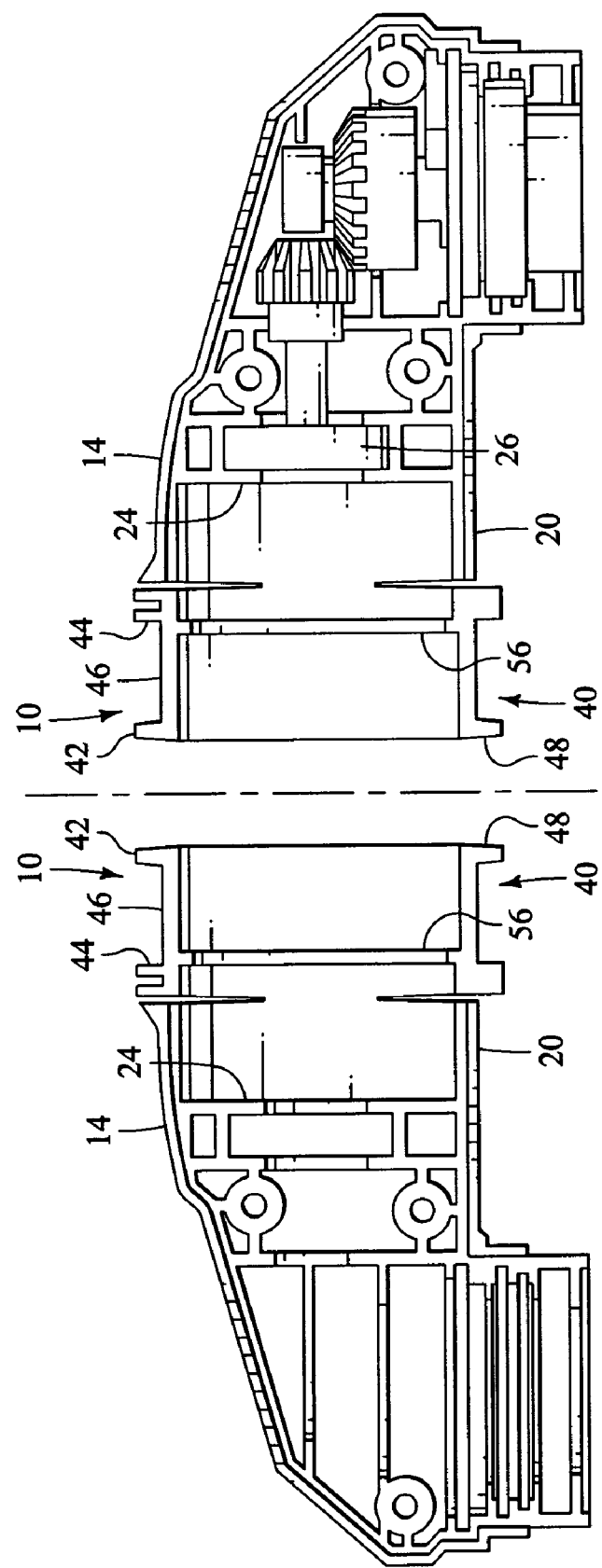
FIG. 4 is an exploded view showing each half of the accessory attachment illustrated in FIG. 1.
Figure 5:
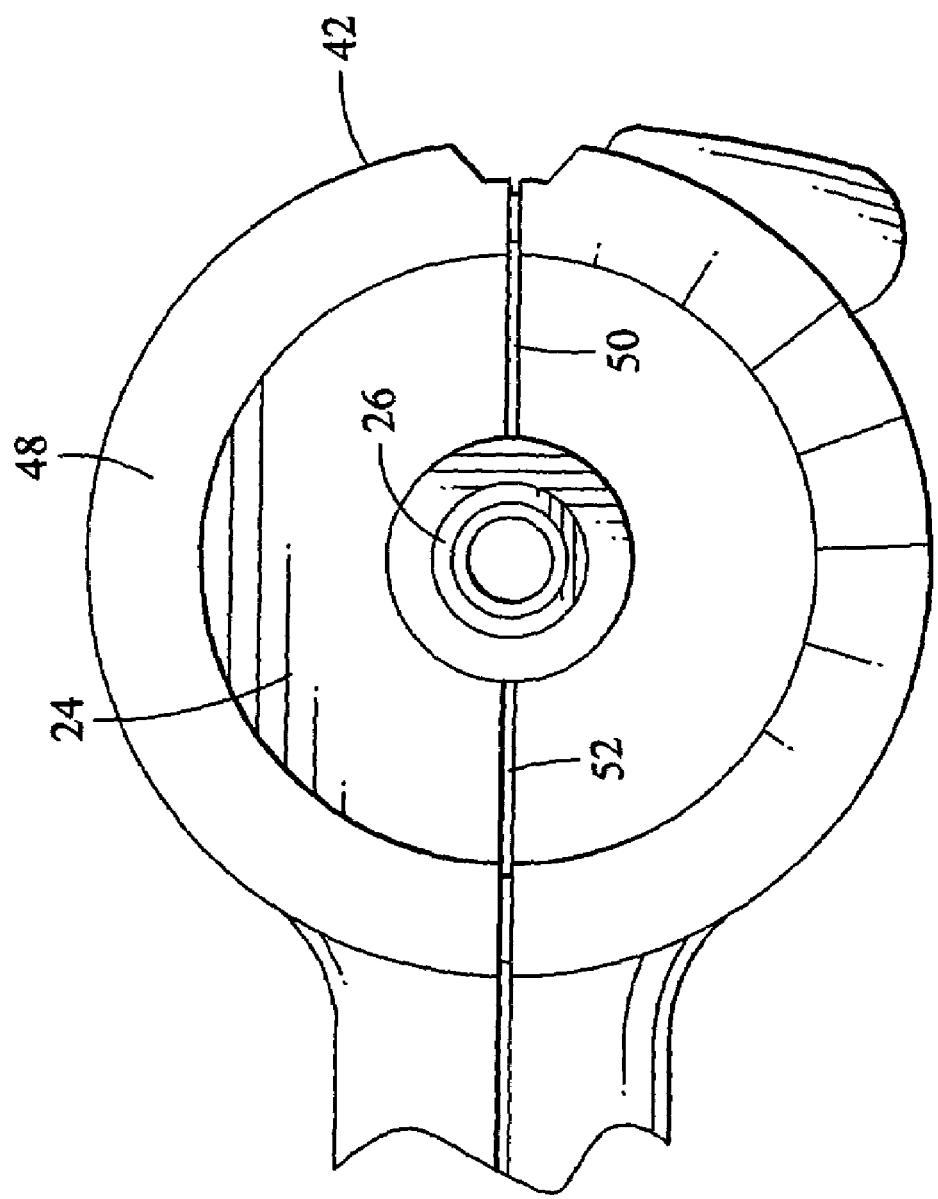
FIG. 5 is an end view of the input shaft of the accessory attachment illustrated in FIG. 1.

Turning now to FIGS. 1–3, the accessory attachment, designated generally at 10, may be used to couple a multitude of different rotating tools to the rotary power hand tool. For example, the rotating tool may be a dust extractor, a circular saw or a router. While it is understood that a variety of accessory attachments may be coupled to the rotary power hand tool, for purposes of illustration only, the accessory attachment 10 will be shown coupled to a right angle circular saw attachment.

Moreover, the rotary power hand tool with which the accessory attachment 10 may be coupled may include a variety of tools, and is particularly useful in tools, which rotate at relatively high speeds. For purposes of illustration, a spiral saw, designated generally at 12, is shown as the rotary power hand tool to which the accessory attachment 10 is coupled.

The accessory attachment 10 includes a housing 14 preferably composed of a rugged, impact resistant plastic material and having an output shaft 16 configured to drive a rotating tool, such as a circular saw 18. For example, the housing 14 may include a nylon, ABS, or polypropylene, and preferably includes a 33% glass-filled nylon. Preferably, the accessory attachment 10 includes two halves that matingly engage one another in a clamshell engagement to form a single housing 14. The housing 14 also includes a generally hollow front portion 20 having a circular opening 22 and a generally cylindrical wall 24 at an opposite end thereof. Disposed within the wall 24 is an opening through which an input shaft 26 of the accessory attachment 10 extends.

The accessory attachment 10 illustrated in FIG. 1 is a right angle attachment in that the orientation of the input shaft 26 of the accessory attachment is generally perpendicular to the orientation of the output shaft 16 of the spiral saw 12. Thus, the accessory attachment 10 includes a bevel gear set 27 to communicate rotational torque from the input shaft 26 to the output shaft 16. Coupled to the output shaft 16 is the exemplary circular saw blade 18.

The spiral saw 12 includes a generally cylindrical housing 28 preferably made of a rugged, impact resistant plastic material and having a substantially cylindrical nose portion 30. Enclosed within the housing 28 is a motor (not shown) that drives a motor output shaft 32 that extends through and from the nose portion 30. A detachable handle 34 is also optionally provided with the spiral saw 12.

The circular opening 22 of the accessory attachment 10 has a predetermined inside diameter that is slightly smaller than the nose portion 30 of the spiral saw 12 so that the nose portion 30 can snugly fit within the circular opening 22 during coupling of the accessory attachment to the spiral saw. Typically, in the absence of the accessory attachment 10, a spiral cutting bit (not shown) or other bit or tool can be coupled to a chuck or the like attached to the motor output shaft 32. However, when the accessory attachment 10 is to be coupled to the spiral saw 12, coupling means are provided to transmit the rotational torque from the output shaft 32 of the spiral saw to the input shaft 26 of the accessory attachment, and then to the output shaft 16 of the accessory attachment.

Coupling of the output shaft 32 of the spiral saw 12 to the input shaft 26 of accessory attachment 10 may be accomplished in a variety of ways. For example, a drive nut or a chuck 36 (as shown) may be coupled to the output shaft 32. The input shaft 26 of the accessory attachment preferably has a square or other noncircular opening so that an intermediate drive shaft having a complementary configured outer end can be inserted into the opening and its opposite end mounted in the chuck 36. In this manner, the spiral saw 12 and accessory attachment 10 are mechanically coupled, with the motor (not shown), output shaft 32 of the spiral saw, and input shaft 26 of the accessory attachment properly aligned.

However, without additional support, maintaining the alignment during operation of the spiral saw 12 is very difficult if not impossible. For this reason, the accessory attachment 10 includes features for maintaining proper alignment. The front portion 20 includes a mounting collar 40 having first and second annular flanges 42, 44 separated by an annular groove 46. An outer wall 48 defines an outside wall of the first annular flange 42. A pair of diametrically opposed longitudinal slots 50, 52 extend through the width of the annular groove 46 and the outer wall 48.

On at least a portion of an inside diameter of the mounting collar 40 is a retention ring 54, which is preferably a thin annular cylindrical layer of resilient material that is preferably molded onto the inside diameter of the mounting collar. The resilient material of the retention ring 54 is preferably a thermoplastic elastomer (TPE) such as santoprene, and may also include a variety of additional fluoroelastomers as well. The retention ring 54 also has a predetermined thickness, preferably in the range of 0.6 mm to 2.0 mm.

To ensure that the retention ring 54 is sized and configured according to the preferred embodiment, the retention ring is preferably molded on the inside surface of the mounting collar 40 via injection molding. Molding the retention ring 54 onto the mounting collar 40 has the added benefit of permanently fusing the retention ring to the mounting collar because the TPE chemically bonds to the mounting collar 40. An annular retention rib 56 is provided at an inwardly spaced location relative to the outer wall 48 of the inside diameter of the mounting collar 40 to facilitate the injection molding process. The retention rib 56 defines a bottom edge of the retention ring 54, and is configured within the accessory attachment 10 prior to molding of the retention ring. Thus, the retention rib 56 forms a barrier during the molding process so that the retention ring 54 is confined to the inside diameter of the mounting collar 40.

Because of the properties inherent to the TPE, the retention ring 54 provides a resilient cushion between accessory attachment 10 and the nose portion 30 of the spiral saw 12. The nose portion 30 is sized and configured to snugly fit in the circular opening 22 and the mounting collar 40, but in the absence of the retention ring 54, there is little to absorb the vibration of the spiral saw 12 during use, and there is little to prevent the rotation of the nose portion 30 relative to the mounting collar 40 in response to vibration. However, the provision of the retention ring addresses both problems by absorbing energy from vibration as it is emitted from the spiral saw 12 and by frictionally engaging the nose portion 30 to prevent rotation of the nose portion 30 within the mounting collar 40. Thus, once the accessory attachment 10 is coupled to the spiral saw 12, the retention ring maintains alignment between an axis of the output shaft 32 of the spiral saw and a corresponding axis of the input shaft 26. Additionally, owing to its resilient properties, the retention ring 54 reduces the need for close manufacturing tolerances of the coupling elements by providing axial and angular "play," or additional tolerance, without compromising the rigidity of the coupling.

Once aligned, an elongated annular band and locking clamp 58 is preferably coupled to the mounting collar 40 to maintain the positional alignment and engagement of the nose portion 30 within the mounting collar. The locking clamp 58 preferably has a generally circular circumference, and in a locked position, has a circumference that is only slightly larger than that of the annular groove 46 and smaller than that of the annular flanges 42, 44. Additionally, the band and locking clamp 58 is preferably sized and configured to nest between the annular flanges 42, 44. Thus, when coupled to the mounting collar 40, the band and locking clamp 58 is preferably disposed between the annular flanges and in abutment with a top surface of the annular groove 46.

While the band and locking clamp 58 may include a variety of locking mechanisms, the preferred locking clamp includes an open position and the locked position. In the open position, the band and locking clamp 58 has a circular circumference that is larger than that of both the annular groove 46 and the annular flanges 42, 44 so that the mounting collar 40 may be inserted in the locking collar. Once positioned around the mounting collar 40, the length of the band and locking clamp 58 is decreased by manipulating the clamp to a closed position. To prevent inadvertent opening and unlocking of the clamp, a radial tab 60 is preferably provided around a portion of the annular flange 44 that coincides with the location of the clamp 58 in the closed position. The prevents the user's hand from accidentally contacting an opening the clamp 58, which instead requires deliberate effort to open.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An accessory attachment for a rotary power hand tool of the type which has a housing with a substantially cylindrical nose portion, a motor having an output shaft with a mounting coupling for receiving a drive shaft extending forwardly from the nose portion, and being concentric therewith, said attachment comprising:
   a housing having an output shaft configured to drive a rotating tool, said housing having an input shaft configured to couple with the drive shaft, such that the motor output shaft, drive shaft and input shaft are aligned on a common axis, said housing having a mounting collar with a substantially cylindrical inside surface sized to slidably fit snugly on the nose portion; and
   a thin annular cylindrical layer of resilient material located between said housing cylindrical inside surface and the nose portion, said layer having a generally uniform thickness and providing a relatively large surface area of contact between said cylindrical inside surface and the nose portion to prevent unwanted rotation between said inside surface and the nose portion and to absorb vibration.

2. An attachment as defined in claim 1 wherein said layer has a thickness within the range of about 0.6 mm to about 2.0 mm.

3. An attachment as defined in claim 1 wherein said layer maintains alignment of the motor output shaft, the drive shaft and said input shaft at rotational speeds as high as 35,000 rpm.

4. An attachment as defined in claim 1 wherein said resilient material reduces vibration that is caused by misalignment of the motor output shaft, the drive shaft and said input shaft.

5. And attachment as defined in claim 1 wherein said resilient material obviates the need for close manufacturing tolerances.

6. An attachment as defined in claim 1 wherein said resilient material obviates the need for high manufacturing tolerances of coupling elements.

7. An attachment as defined in claim 1 wherein said housing comprises glass-filled nylon.

8. An attachment as defined in claim 1 wherein said resilient material comprises a thermoplastic elastomer.

9. An attachment as defined in claim 1 wherein said resilient material is molded to said substantially cylindrical inside surface of said mounting collar.

10. An attachment as defined in claim 1 wherein said mounting collar includes a pair of slots.

11. An attachment as defined in claim 1 wherein the nose portion includes an annular groove.

12. An attachment as defined in claim 1 wherein said mounting collar includes an annular rib around at least a portion of an internal circumference.

13. An attachment as defined in claim 1 wherein said mounting collar includes a radial tab extending therefrom.

14. An accessory attachment for a rotary power hand tool of the type which has a housing with a substantially cylindrical nose portion, a motor having an output shaft with a mounting coupling for receiving a drive shaft extending forwardly from the nose portion, and being concentric therewith, said attachment comprising:
   a housing having an output shaft configured to drive a rotating tool, said housing having an input shaft configured to couple with the drive shaft, such that said motor output shaft, drive shaft and input shaft are aligned on a common axis, said housing having a mounting collar with a substantially cylindrical inside surface sized to slidably fit snugly on the nose portion;
   a thin annular cylindrical layer of resilient material located between said housing cylindrical inside surface and the nose portion; and
   an annular retention ring disposed axially inwardly from the end of said mounting collar on said inside surface of said mounting collar.

15. An accessory attachment for a rotary power hand tool of the type which has a housing with a substantially cylindrical nose portion, a motor having an output shaft with a mounting coupling for receiving a drive shaft extending forwardly from the nose portion, and being concentric therewith, said attachment comprising:
   a housing having an output shaft configured to drive a rotating tool, said housing having an input shaft configured to couple with the drive shaft, such that the motor output shaft, drive shaft and input shaft are aligned on a common axis, said housing having a mounting collar with a substantially cylindrical inside surface sized to slidably fit snugly on the nose portion; and
   a thin annular cylindrical layer of resilient material located between said housing cylindrical inside surface and the nose portion;
   said mounting collar comprises first and second annular flanges separated by a annular groove.

16. An attachment as defined in claim 15 further comprising an annular clamp disposed around at least a portion of said annular groove.

17. An attachment for a rotary hand tool of the type which has an outer enclosure with a nose portion, a tool holder rotating about an axis, and a bit mounted in the tool holder for engaging a work surface, the bit being of the type which has a long narrow cylindrical shape with an outer cutting surface for engaging a work piece, the cutting surface extending at least throughout a portion of the length of the bit, said attachment comprising:
   housing means for receiving the nose portion;
   retention means for frictionally retaining the nose portion;

locking means including an annular groove disposed around a circumference of said housing means for locking the nose portion within the housing means.

18. An attachment as defined in claim 17 wherein said retention means includes a plastic ring molded within said housing means.

19. An attachment as defined in claim 17 where said retention means includes an annular rib disposed within said housing and an annular groove disposed on the nose portion.

20. An attachment as defined in claim 17 wherein.

21. An attachment as defined in claim 20 wherein said locking means includes an annular clamp configured to lockingly engage said annular groove.

22. An attachment as defined in claim 20 wherein said circumference of said housing means includes a pair of grooves.

* * * * *